United States Patent
Poechmueller et al.

(10) Patent No.: US 9,610,942 B2
(45) Date of Patent: Apr. 4, 2017

(54) DEVICE AND METHOD FOR OPERATING A VEHICLE

(71) Applicants: Werner Poechmueller, Hildesheim (DE); Stefan Nordbruch, Kornwestheim (DE); Andreas Lapp, Tamm (DE); Michael Knoop, Ludwigsburg (DE); Tino Sommer, Leinfelden (DE); Wolfgang Stolz, Leonberg (DE)

(72) Inventors: Werner Poechmueller, Hildesheim (DE); Stefan Nordbruch, Kornwestheim (DE); Andreas Lapp, Tamm (DE); Michael Knoop, Ludwigsburg (DE); Tino Sommer, Leinfelden (DE); Wolfgang Stolz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

(21) Appl. No.: 14/357,482

(22) PCT Filed: Sep. 17, 2012

(86) PCT No.: PCT/EP2012/068223
§ 371 (c)(1),
(2) Date: May 9, 2014

(87) PCT Pub. No.: WO2013/072096
PCT Pub. Date: May 23, 2013

(65) Prior Publication Data
US 2015/0019042 A1     Jan. 15, 2015

(30) Foreign Application Priority Data
Nov. 15, 2011   (DE) .................. 10 2011 086 336

(51) Int. Cl.
| | | |
|---|---|---|
| *B60W 30/02* | (2012.01) | |
| *B60W 30/188* | (2012.01) | |
| *B60W 50/14* | (2012.01) | |
| *B60W 50/00* | (2006.01) | |

(Continued)

(52) U.S. Cl.
CPC .......... *B60W 30/02* (2013.01); *B60W 30/188* (2013.01); *B60W 50/0098* (2013.01);
(Continued)

(58) Field of Classification Search
CPC .. B60W 50/0098; B60W 50/14; B60W 30/02; B60W 30/188; B60W 2050/0025;
(Continued)

(56) References Cited

U.S. PATENT DOCUMENTS

2003/0171865 A1* 9/2003 Moser ............... B60G 17/0195
701/48
2005/0228553 A1* 10/2005 Tryon ..................... B60K 6/46
701/22

(Continued)

FOREIGN PATENT DOCUMENTS

| CN | 101063481 A | 10/2007 |
|---|---|---|
| DE | 100 25 493 | 12/2001 |

(Continued)

OTHER PUBLICATIONS

International Search Report for PCT/EP2012/068223, dated Dec. 4, 2012.

*Primary Examiner* — Mussa A Shaawat
(74) *Attorney, Agent, or Firm* — Gerard Messina

(57) ABSTRACT

A device for operating a vehicle includes: a vehicle movement module for forming control signals for a control unit of an actuating system of the vehicle; an energy management module for managing energy which is available for a vehicle operation, the energy management module being configured to form further control signals for the control unit as a (Continued)

function of the available energy, and a prioritizer for prioritizing the control signals over the further control signals as a function of a vehicle position and/or a vehicle movement state for stabilizing the vehicle.

11 Claims, 3 Drawing Sheets

(52) U.S. Cl.
CPC ..... *B60W 50/14* (2013.01); *B60W 2050/0025* (2013.01); *B60W 2050/0091* (2013.01); *B60W 2050/0094* (2013.01); *B60W 2050/146* (2013.01); *B60W 2550/12* (2013.01); *B60W 2550/141* (2013.01); *B60W 2550/143* (2013.01); *B60W 2550/402* (2013.01)

(58) Field of Classification Search
CPC ... B60W 2550/402; B60W 2050/0094; B60W 2050/146; B60W 2550/12; B60W 2550/141; B60W 2550/143; B60W 2050/0091

See application file for complete search history.

(56) References Cited

U.S. PATENT DOCUMENTS

| | | | |
|---|---|---|---|
| 2006/0173601 A1* | 8/2006 | Bassiere | B60G 17/0195 701/53 |
| 2007/0142985 A1* | 6/2007 | Kumar | B60L 11/1801 701/22 |
| 2008/0312031 A1* | 12/2008 | Reith | B60T 8/1755 477/92 |
| 2012/0105013 A1* | 5/2012 | Lin | G01R 31/3624 320/162 |

FOREIGN PATENT DOCUMENTS

| | | |
|---|---|---|
| DE | 10 2008 034 910 | 3/2009 |
| DE | 10 2008 019 174 | 10/2009 |
| DE | 10 2009 040 682 | 3/2011 |
| DE | 10 2009 039 614 | 3/2011 |
| DE | 10 2010 015 423 | 10/2011 |
| JP | 3 279021 | 12/1991 |
| WO | WO 2004/014700 | 2/2004 |
| WO | WO 2007/054324 | 5/2007 |

\* cited by examiner

DEVICE AND METHOD FOR OPERATING A VEHICLE

BACKGROUND OF THE INVENTION

1. Field of the Invention

The present invention relates to a device and to a method for operating a vehicle.

2. Description of the Related Art

Methods for anticipatorily influencing a vehicle speed, a vehicle transmission and a vehicle brake to reduce a required fuel quantity along a driving route are known from the published German patent application documents DE 10 2008 019 174, DE 10 2008 034 910 and DE 10 2009 040 682.

BRIEF SUMMARY OF THE INVENTION

It is the object of the present invention to provide an improved device and an improved method for operating a vehicle.

It is another object of the present invention to provide a corresponding system for operating a vehicle and a corresponding computer program.

According to one aspect, a device for operating a vehicle is provided. The device includes a vehicle movement module for forming control signals for a control unit of an actuating system of the vehicle. This means in particular that the vehicle movement module forms control signals which are transmitted to a control unit of an actuating system of the vehicle. The control unit then controls the actuating system of the vehicle in accordance with the control signals.

The device further includes an energy management module for managing energy which is available for a vehicle operation. The energy management module is configured to form further control signals for the control unit as a function of the available energy. This means in particular that the control unit may control the actuating system in accordance with the further control signals.

The device further includes a prioritizer for prioritizing the control signals over the further control signals as a function of a vehicle position for stabilizing the vehicle.

According to another aspect, a method for operating a vehicle is provided. A vehicle movement module forms control signals for a control unit of an actuating system of the vehicle for this purpose. An energy management module for managing energy which is available for a vehicle operation forms further control signals for the control unit as a function of the available energy. As a function of a vehicle position and/or a vehicle movement state, the control signals are prioritized over the further control signals for stabilizing the vehicle.

According to another aspect, a system for operating a vehicle is provided. The system includes the device for operating a vehicle, the prioritizer being integrated into the vehicle movement module, and the vehicle movement module including an actuator interface for the control unit and an energy management interface for the energy management module. The control unit of the actuating system is coupled or connected to the actuator interface. The energy management module is coupled or connected to the energy management interface.

According to still another aspect, a computer program is provided, which includes program code for carrying out the method for operating a vehicle if the computer program is executed on a computer.

The present invention thus in particular includes the idea of prioritizing control signals, which are formed with the aid of the vehicle movement module, over the further control signals, which are formed with the aid of the energy management module, as a function of a vehicle position and/or a vehicle movement state for stabilizing the vehicle. This means in particular that the control signals of the vehicle movement module are treated preferentially as compared to the further control signals of the energy management module. This means in particular that the control signals of the vehicle movement module are transmitted preferentially to the control unit of the actuating system as compared to the further control signals of the energy management module.

The energy management module may thus calculate a particular vehicle driving strategy, for example, to minimize a fuel quantity or electrical energy consumption on a predetermined driving route. The energy management module accordingly forms further control signals. However, this vehicle driving strategy may result in an unstable position of the vehicle, for example. The vehicle movement module may then form in particular control signals for the control unit so that the vehicle, or the vehicle position, may be stabilized again with the aid of an appropriate intervention of the actuating system in a vehicle operation. These control signals which result in a stabilization of the vehicle are thus prioritized and transmitted preferentially to the control unit. It may be provided that further control signals of the energy management module are transmitted to the control unit of the actuating system for an accordingly minimized vehicle driving strategy only once, in particular when the vehicle has been sufficiently stabilized. For example, the event may also occur where the vehicle is in an unstable position. In such a case it is initially more important to stabilize the vehicle before applying a vehicle driving strategy to minimize a fuel quantity or electrical energy consumption.

The safety of a vehicle operation is advantageously considerably increased by prioritizing control signals for a control unit of an actuating system which result in a stabilization of the vehicle over the further control signals of an energy management module which result in a minimized fuel quantity consumption.

Stabilizing or a stabilization within the sense of the present invention means in particular that the vehicle is brought into a stable state and/or is maintained in such a state with the aid of an intervention of an actuating system of the vehicle in a vehicle operation.

An actuating system within the sense of the present invention in particular denotes a system which may intervene in a vehicle operation and/or in vehicle driving. An actuating system may be, for example, a steering system, in particular an electrical power steering system. An actuating system may also be a drive train system, for example. An actuating system may preferably be a vehicle dynamics control system, which is known as an electronic stability program (ESP). An actuating system may, for example, also be an anti-lock braking system or a traction control system. An actuating system may, for example, be a braking system or a drive system of the vehicle. An actuating system thus in particular denotes a system which implements requirements directed to it in regard to a vehicle movement, such as acceleration, braking and/or steering, in order to drive the vehicle accordingly.

A control unit within the sense of the present invention may also be referred to as a controller and may in particular be implemented in hardware and/or in software. Such controllers control in particular the actuating systems of the vehicle which are connected to them.

According to one specific embodiment, the control signals and/or the further control signals may be formed based on sensor signals from surroundings sensors for detecting vehicle surroundings by sensors. This means in particular that, based on vehicle surroundings detected by sensors, an appropriate intervention in a vehicle operation may take place by activating the actuating systems.

Sensor signals from surroundings sensors within the sense of the present invention include in particular surroundings sensor data which correspond to the vehicle surroundings detected by sensors. Such surroundings sensor data may in particular also be referred to as vehicle surroundings data and include in particular information about the vehicle surroundings. Such information may relate to physical objects, for example. A physical object may be, for example, another vehicle, a pedestrian, a traffic sign, a signaling system or a guide post of a road. The vehicle surroundings data include in particular physical features or properties of the road, such as a width of the road, a width of the lane, curve radii and/or exit ramps. In particular the respective position and dimensions are stored in the vehicle surroundings data in the case of stationary physical objects. Vehicle surroundings data may in particular also include information about present circumstances, for example that a construction site having changed road conditions is located in the relevant position. Vehicle surroundings data may in particular also include lane data, which include the information about a lane marking color, for example. Vehicle surroundings data within the sense of the present invention include in particular images and/or videos. In particular a relevant position, which may be determined in particular with the aid of a global positioning system (GPS) sensor, is assigned to the vehicle surroundings data.

Surroundings sensors within the sense of the present invention may be, for example, radar sensors, video sensors, in particular video sensors of a 3D camera or of a surround camera system for recording an image of 360° surroundings of the vehicle, or ultrasound sensors. Surroundings sensors may include, for example, LIDAR sensors, time of flight sensors and/or a photonic mixer device (PMD) sensor. A PMD sensor may be used in particular as an image sensor in TOF cameras, TOF denoting "time of flight" and being based on speed of light methods. The video camera may in particular be a stereo video camera.

According to one specific embodiment, the prioritizer is integrated into the vehicle movement module, the vehicle movement module including in particular an actuator interface for the control unit and in particular an energy management interface for the energy management module. The control unit may then advantageously be connected or coupled to such an actuator interface so that the control signals and the further control signals may advantageously be transmitted to the control unit. The energy management module may then advantageously be connected or coupled to the energy management interface so that the further control signals of the energy management module may advantageously be transmitted to the vehicle movement module. By integrating the prioritizer into the vehicle movement module, in particular a prioritization of the control signals over the further control signals may then advantageously be carried out directly in the vehicle movement module. Such a system in particular has the advantage that it may have a compact design. Moreover, corresponding signal lines also do not have an unnecessary length, so that a relevant response time is advantageously considerably shortened. Advantageously it is also possible that multiple actuator interfaces are provided for multiple control units. In this way, multiple control units of multiple actuating systems may advantageously be coupled or connected to the vehicle movement module.

In another specific embodiment, the energy management module includes a data detection module. The data detection module detects in particular data which are relevant for calculating a vehicle driving strategy. Such data may include surroundings sensor data and/or navigation data, for example. The data detection module is in particular configured to assign a quality factor to the detected data, the energy management module preferably being designed to form the further control signals as a function of the detected data and the assigned quality factor. This means in particular that the energy management module detects data which are relevant for calculating a vehicle driving strategy and which are preferably assigned a quality factor, the further control signals being formed, for example, as a function of the detected data and the assigned quality factor. This means in particular that the data, which form the basis for forming the further control signals for a vehicle driving strategy to minimize a fuel quantity consumption, may be classified according to signal quality and number. Accordingly, further control signals may then be formed, which control the control unit, or the control units, of the actuating system, or of the actuating systems, in such a way that only a certain functional scope of the actuating system is enabled. For example, it may also be provided that a functional scope of the actuating system is not enabled at all. Higher quality data, for example, which were formed with the aid of a high-quality surroundings sensor, for example, for detecting vehicle surroundings by sensors, are considered more strongly in the calculation of a vehicle driving strategy than lower quality data.

In another specific embodiment, the energy management module includes a human-machine interface for providing vehicle driving instructions in accordance with the available energy.

This means in particular that the energy management module may advantageously provide vehicle driving instructions to a driver, so that the driver may control the vehicle accordingly based on these vehicle driving instructions to advantageously minimize a fuel quantity or electrical energy consumption.

According to another specific embodiment, a vehicle movement sensor and/or position sensor is/are provided, which is/are designed to detect a vehicle movement state and/or a vehicle position. Preferably multiple movement or position sensors may be provided for detecting a vehicle position by sensors. The movement sensor and the position sensor are in particular connected to the vehicle movement module, so that relevant sensor signals of the movement sensor and of the position sensor may be transmitted to the vehicle movement module. The vehicle movement module thus advantageously gains knowledge of the instantaneous vehicle movement state and of the instantaneous vehicle position.

The present invention will be described in greater detail hereafter based on preferred exemplary embodiments.

DETAILED DESCRIPTION OF THE INVENTION

Figure 1:
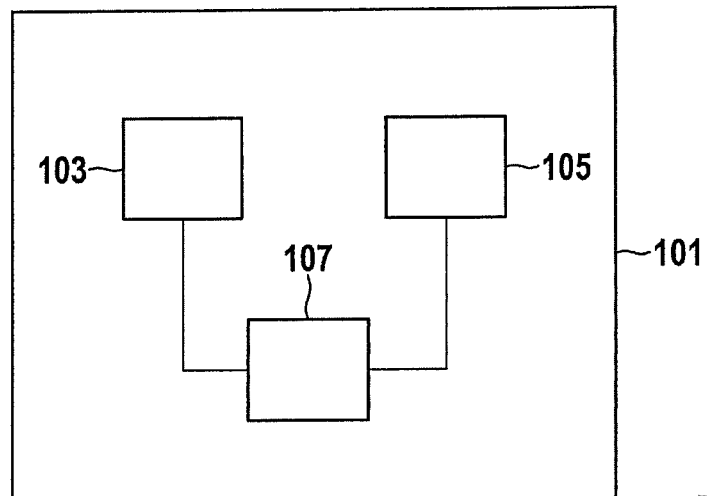
FIG. 1 shows a device for operating a vehicle.

Hereafter, identical reference numerals are used for identical features.

FIG. 1 shows a device 101 for operating a vehicle (not shown). Device 101 includes a vehicle movement module 103 for forming control signals for a control unit (not shown) of an actuating system (not shown) of the vehicle. Device 101 further includes an energy management module 105 for managing energy which is available for a vehicle operation, energy management module 105 being designed or configured to form further control signals for the control unit as a function of the available energy. Device 101 further includes a prioritizer 107 for prioritizing the control signals over the further control signals as a function of a vehicle position for stabilizing the vehicle.

In this way a stabilization of the vehicle is advantageously carried out with a higher priority than that of carrying out a vehicle driving strategy for energy minimization or for reducing a fuel quantity or electrical energy consumption. As a result, an architectural division takes place between the vehicle movement module, which provides in particular solely a vehicle movement model, and an energy management module, which provides in particular an anticipatory energy-related evaluation of an operating strategy or vehicle driving strategy. Both modules communicate with each other via relevant interfaces.

Figure 2:
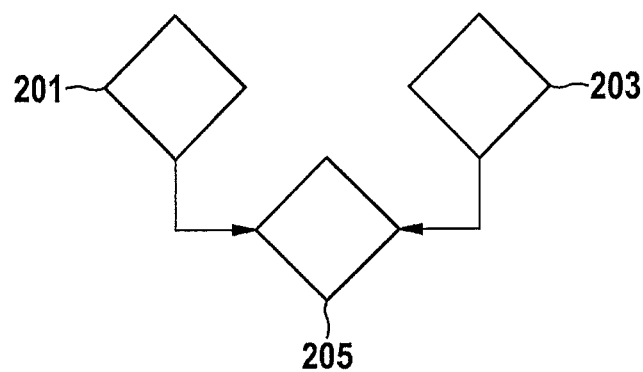
FIG. 2 shows a flow chart of a method for operating a vehicle.

FIG. 2 shows a flow chart of a method for operating a vehicle. In a step 201, control signals for a control unit of an actuating system of the vehicle are formed with the aid of a vehicle movement module.

According to a step 203, further control signals are formed for the control unit as a function of the available energy with the aid of an energy management module for managing energy which is available for a vehicle operation. Steps 201 and 203 may preferably be carried out simultaneously or consecutively. According to a step 205, the control signals of the vehicle movement module are prioritized over the further control signals of the energy management module as a function of a vehicle position in order to advantageously carry out a stabilization of the vehicle.

In one specific embodiment which is not shown, it may be provided that the energy management module detects data which are relevant for calculating a vehicle driving strategy to reduce an energy consumption, for example a fuel quantity consumption. A quality factor is in particular assigned to these data, the further control signals being formed as a function of the detected data and the assigned quality factor. For example, it may be provided that surroundings sensor data, which were formed with the aid of one or multiple surroundings sensors for detecting vehicle surroundings by sensors, are provided to the data detection module. The data detection module may be provided in particular with navigation data of a navigation system.

For example, the energy management module may provide further control signals which may influence or control a driving behavior of a vehicle, in particular advantageously in order to optimize an energy flow of the vehicle and, for example, advantageously implement or carry out a comprehensive operating range management in the vehicle. The energy management module may preferably provide a speed recommendation for the vehicle, which in particular is an electric vehicle, i.e., a vehicle having an electric drive, to reach the predefined destination with an instantaneous battery charge state.

In one specific embodiment which is not shown, the energy management module may include a range estimation module. Such a module estimates an operating range of the vehicle based on the instantaneously available energy, in particular based on the presently available data. This module may in particular detect the following data for the projection on the energy household: driver requirements via a user interface, instantaneous vehicle data regarding an energy household with the aid of a vehicle sensor system, and data of the surroundings with the aid of the surroundings sensor system, such as weather data or traffic data. These data of the surroundings may be maps, or GPS or radar data, for example.

These detected data are included in particular in models for the energy storage, energy balance and consumption of power units, in particular ancillary units, of the vehicle. It may be provided to classify these data according to signal quality and number and to take this into consideration in the functional scope of the subsequent function blocks. This means, for example, that a relevant quality factor is assigned to these data, the further control signals being formed as a function of the detected data and of the assigned quality factor. The further control signals then control in particular the control unit or units of the actuating system or systems in such a way that these provide only a functional scope in accordance with the available energy. For example, a particular driver assistance function may not be available, or only to a limited extent, at a charge state of the battery which is too low. This preferably means that particular functions are enabled as a function of the number of signals and the signal quality. This means in particular that the quality of the surroundings model may influence the available or enabled functional scope. Preferably a situation analysis for a range management module, which is included in the energy management module, is advantageously derived from this.

The results of the situation analysis may advantageously be incorporated into an operating strategy or vehicle driving strategy. A decision is then made here in particular about a distribution of the available energy in regard to a vehicle drive, the units, in particular ancillary units, and storage. The operating strategy moreover decides in particular about a use of the information. It may be provided that only information is output to the driver. For example, it may be communicated to the driver how high the operating range of the vehicle still is. Preferably it may be provided that the driver is provided with a recommendation or measure for energy minimization. For example, a recommendation to reduce a vehicle speed may be predefined for the driver. Preferably it may be provided that an autonomous intervention into a vehicle operation is carried out with the aid of an appropriate actuating system.

Figure 3:
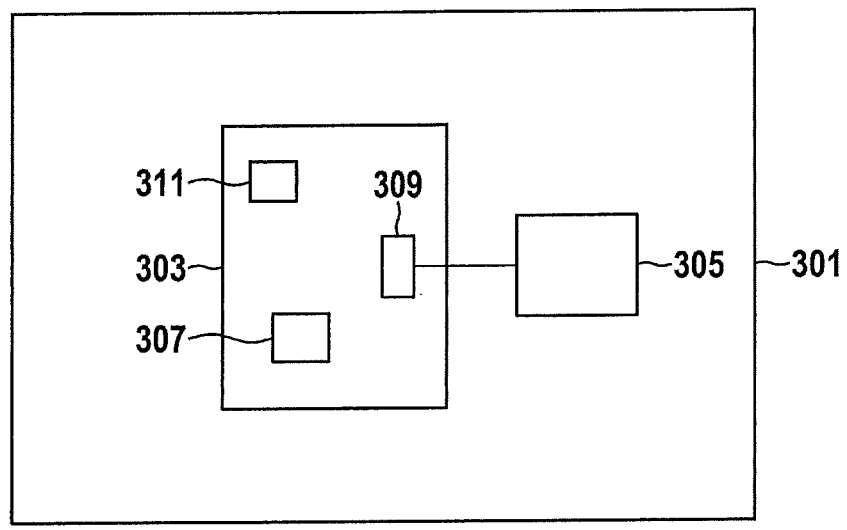
FIG. 3 shows a further device for operating a vehicle.

FIG. 3 shows a further device 301 for operating a vehicle (not shown). Analogously to device 101 according to FIG. 1, device 301 includes a vehicle movement module 303, an energy management module 305 and a prioritizer 307. Prioritizer 307 here is integrated into vehicle movement module 303. Vehicle movement module 303 further includes an energy management interface 309 to which energy management module 305 is coupled or connected. Vehicle movement module 303 further includes an actuator interface 311 to which in particular a control unit of an actuating system of the vehicle may be connected or coupled.

Figure 4:
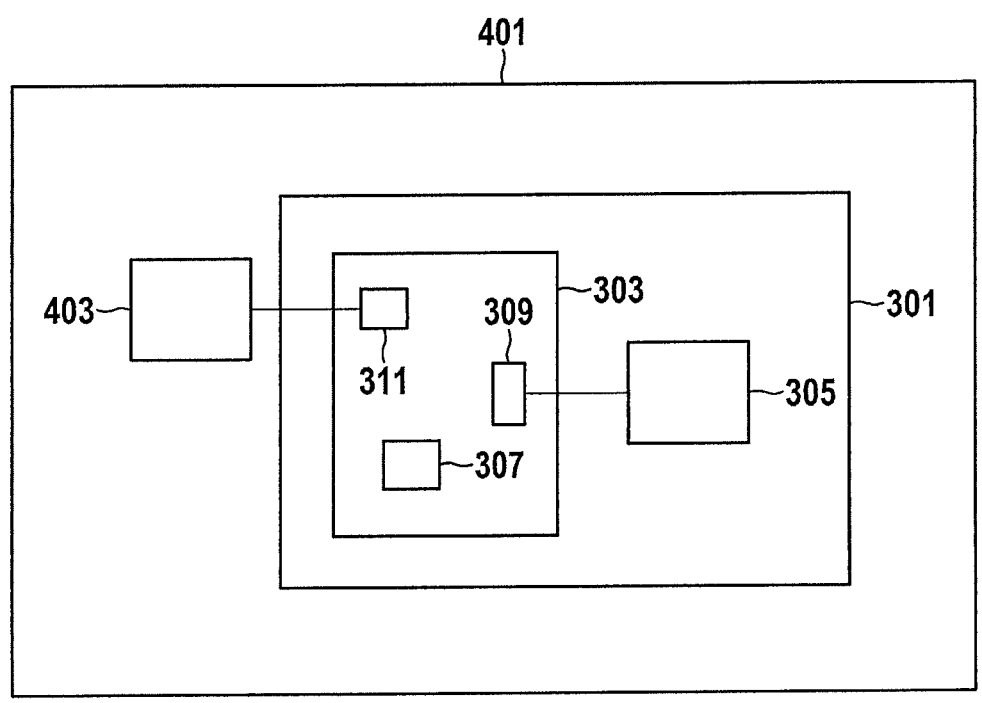
FIG. 4 shows a system for operating a vehicle.

FIG. 4 shows a system 401 for operating a vehicle (not shown). System 401 includes device 301 according to FIG. 3. System 401 further includes a control unit or a controller 403 of an actuating system (not shown) of the vehicle.

Control unit 403 is connected to vehicle movement module 303 with the aid of actuator interface 311.

In one specific embodiment which is not shown, it may be provided that multiple actuator interfaces 311 are formed, to each of which a control unit 403 of an actuating system may be connected or coupled.

Figure 5:
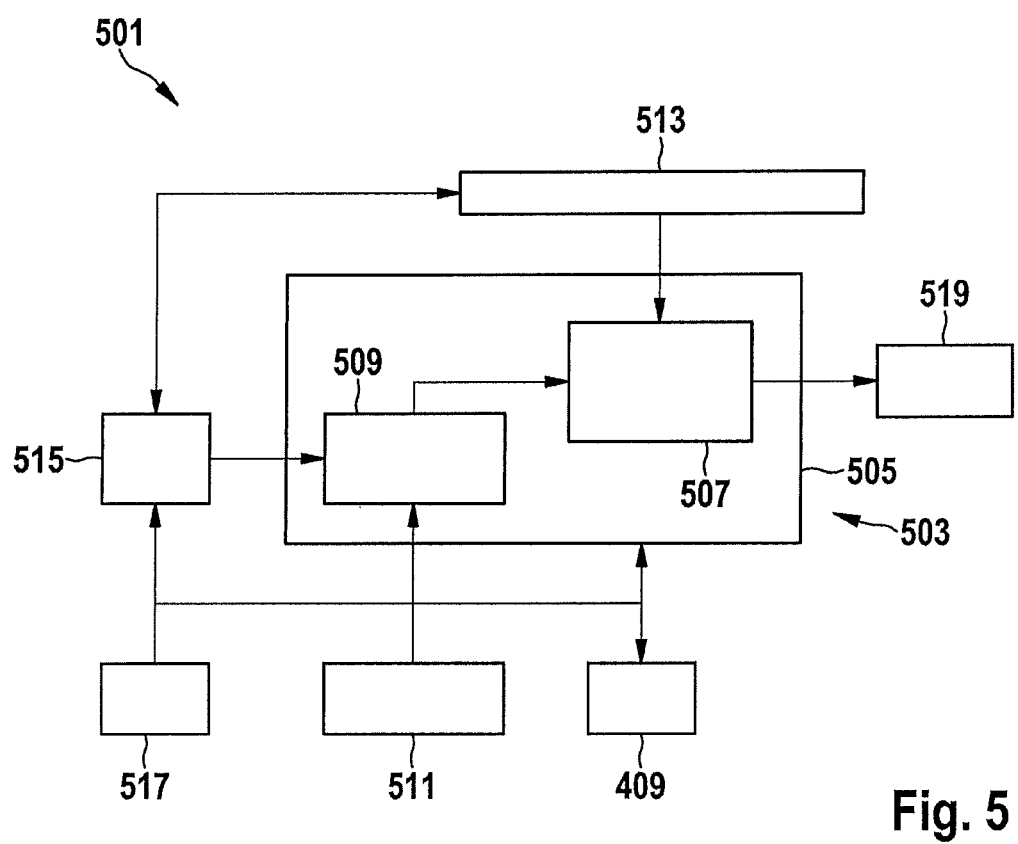
FIG. 5 shows a further system for operating a vehicle.

FIG. 5 shows a further system 501 for operating a vehicle. System 501 includes a device 503 for operating a vehicle. Device 503 includes a signal management module 505.

Signal management module 505 includes a vehicle movement module 507 and a vehicle surroundings module 509. Vehicle surroundings module 509 receives sensor signals or surroundings sensor data from surroundings sensors 511 and, based thereon, provides a vehicle surroundings model to vehicle movement module 507, so that this module, in particular based on the model, forms control signals. For the sake of clarity, these surroundings sensors data are identified symbolically with the aid of a rectangle having reference numeral 511 in FIG. 5.

Moreover an energy management module 513 is formed, which is coupled or connected to vehicle movement module 507 with the aid of a relevant energy management interface, which is not shown here. Energy management module 513 receives data of a vehicle surroundings calculating device 515, which in turn receives data of a navigation system 517, including a digital map. Vehicle surroundings calculating device 515 calculates in particular vehicle surroundings based on the navigation data provided with the aid of navigation system 517. In one specific embodiment which is not shown, it may be provided that vehicle surroundings calculating device 515 also receives data from other surroundings sensors of other vehicles or of an infrastructure. These data are provided to energy management module 513, which accordingly forms further control signals and provides them to vehicle movement module 507 with the aid of the energy management interface, which is not shown here. Vehicle surroundings calculating device 515 may also be referred to as an electronic horizon since it calculates in particular a far field, for example starting at approximately 300 meters relative to the vehicle, of the vehicle surroundings. Vehicle surroundings calculating device 515 is configured in particular to calculate a vehicle route based on the provided data.

Vehicle surroundings calculating device 515 also provides the accordingly calculated vehicle surroundings to vehicle surroundings module 509. Based on the sensor signals and the calculated vehicle surroundings, vehicle surroundings module 509 then calculates a vehicle surroundings model, which here may also be referred to as an expanded vehicle surroundings model. This expanded model is provided via suitable interfaces to vehicle movement module 507, which forms corresponding control signals and outputs them to control units of actuating systems of the vehicle. The multiple control units are identified symbolically here with the aid of a rectangle having reference numeral 519. Signal management module 503 manages preferably advantageously the sensor signals provided to it and may forward or transmit these to control units 519 of the actuating systems analogously to a router, for example according to predefined rules.

Moreover, it may be provided in particular that energy management module 513 transmits information about an energy household, in particular about available energy, of the vehicle to vehicle surroundings calculating device 515, so that this device advantageously accordingly adapts and/or optimizes an instantaneous driving route or navigation route of the vehicle. Vehicle surroundings calculating device 515 preferably transmits digital maps, for example topology data, GPS data, data of external vehicles and/or external infrastructures, to energy management module 513, so that advantageously this module may preferably consider this information in an operating range calculation.

Preferably it may be provided that energy management module 513 transmits limitations and/or actuating reserves to vehicle movement module 507 via the energy management interface. Such actuating reserves may include, for example, actuating reserves during regenerative braking and/or a limitation of a vehicle speed.

Preferably it may be provided that energy management module 513 outputs or provides information about an energy household and/or driving instructions and/or driving recommendations for vehicle control or vehicle driving to a driver via a human-machine interface, for example with the aid of a screen.

A prioritizer, which is not shown here for the sake of clarity and may be integrated in particular into signal management module 505 or into vehicle movement module 507, prioritizes the control signals of vehicle movement module 507 over the further control signals of energy management module 513 as a function of a vehicle position in order to advantageously carry out a stabilization of the vehicle.

In one specific embodiment which is not shown, the interfaces to the surroundings sensors may be designed either at the feature level, such as detected edges in the case of video, or at the object level, such as a detected vehicle in the case of radar or video.

Preferably the following influencing variables on a vehicle movement may be provided for the interfaces to the actuating systems.

In particular a longitudinal force $F_x$ may be provided as an influencing variable for commands or requests regarding acceleration or deceleration. In the case of a command or request for acceleration, an engine drive system and/or transmission system is/are controlled as the actuating system. In the case of a command for deceleration, in particular an ESP and/or an engine drive system and/or a transmission system is/are controlled as the actuating system with the aid of an appropriate engine drag torque and/or regenerative braking in electric vehicles.

In particular a yawing moment $M_Z$ may also be provided as the influencing variable for commands or requests regarding a change in the driving direction. One-sided brake interventions may be carried out with the aid of the ESP for this purpose. With the aid of an electronic power steering system, also referred to as EPS, the requested yawing moment may then be converted into a steering moment request with the aid of a downstream steering moment regulator.

Preferably it may be provided that the corresponding calculations in the individual components of system 501 are carried out internally in the particular component itself. In particular it may be provided that the corresponding calculations are carried out externally by the vehicle, for example with the aid of an external server. Preferably a combination of internal and external calculations, i.e., both in system 501 and in the external server, may be provided. Appropriate communication between the vehicle and the external server may be carried out with the aid of a WLAN communication method and/or the long term evolution (lte [sic; LTE]) communication method, for example.

The present invention thus in particular also includes the idea that the vehicle movement module assumes functions having high dynamics and high priority for vehicle driving and provides an appropriate intervention strategy on the part of the actuating systems. The energy management module in particular assumes a higher-level, energy-optimized vehicle driving strategy having low dynamics and lower priority. The prioritization is carried out by the prioritizer, which may preferably be integrated into the vehicle movement module, as an interposed functional block for the individual actuating systems, i.e., in particular for the operative chain involving the drive, brake, steering system and/or damping/suspension.

What is claimed is:

1. A device for operating a vehicle, comprising:
    a vehicle movement module for forming first control signals for a control unit of an actuating system of the vehicle;
    an energy management module for managing energy which is available for a vehicle operation from at least one of i) available fuel, and ii) stored electrical energy, wherein the energy management module is configured to form second control signals for the control unit as a function of the available energy;
    a prioritizer for prioritizing the first control signals over the second control signals as a function of at least one of a vehicle position and a vehicle movement state, for stabilizing the vehicle; and
    wherein the prioritizer is integrated into the vehicle movement module, and the vehicle movement module includes an actuator interface for the control unit and an energy management interface for the energy management module.

2. The device as recited in claim 1, wherein the energy management module includes a data detection module for detecting data which are relevant for calculating a vehicle driving strategy, the data detection module being configured to assign a quality factor to the detected data, and wherein the energy management module is configured to form the second control signals as a function of the detected data and the assigned quality factor.

3. The device as recited in claim 2, wherein the energy management module includes a human-machine interface for providing a vehicle driving instruction in accordance with the available energy.

4. A method for operating a vehicle, comprising:
    forming, by a vehicle movement module, first control signals for a control unit of an actuating system of the vehicle;
    forming, by an energy management module for managing energy which is available for a vehicle operation from at least one of i) available fuel, and ii) available stored electrical energy, second control signals for the control unit as a function of the available energy;
    prioritizing, by a prioritizer, the first control signals over the second control signals as a function of the vehicle position for stabilizing the vehicle;
    wherein the prioritizer is integrated into the vehicle movement module, and the vehicle movement module includes an actuator interface for the control unit and an energy management interface for the energy management module.

5. The method as recited in claim 4, wherein the energy management module detects data which are relevant for calculating a vehicle driving strategy and which are assigned a quality factor, and wherein the second control signals are formed as a function of the detected data and the assigned quality factor.

6. The method as recited in claim 5, wherein the energy management module provides a vehicle driving instruction with the aid of a human-machine interface in accordance with the available energy.

7. A system for operating a vehicle, comprising:
    a control unit of an actuating system of the vehicle;
    a vehicle movement module for forming first control signals for the control unit of the actuating system of the vehicle;
    an energy management module for managing energy which is available for a vehicle operation from at least one of i) available fuel, and ii) available stored electrical energy, wherein the energy management module is configured to form second control signals for the control unit as a function of the available energy; and
    a prioritizer for prioritizing the first control signals over the second control signals as a function of at least one of a vehicle position and a vehicle movement state, for stabilizing the vehicle;
    wherein the vehicle movement module includes an actuator interface for the control unit and an energy management interface for the energy management module, wherein the control unit of the actuating system is coupled to the actuator interface and the energy management module is coupled to the energy management interface.

8. A non-transitory computer-readable data storage medium storing a computer program having program codes which, when executed on a computer, perform a method for operating a vehicle, the method comprising:
    forming, by a vehicle movement module, first control signals for a control unit of an actuating system of the vehicle;
    forming, by an energy management module for managing energy which is available for a vehicle operation from at least one of i) available fuel, and ii) available stored electrical energy, second control signals for the control unit as a function of the available energy; and
    prioritizing, by a prioritizer, the first control signals over the second control signals as a function of the vehicle position for stabilizing the vehicle;
    wherein the prioritizer is integrated into the vehicle movement module, and the vehicle movement module includes an actuator interface for the control unit and an energy management interface for the energy management module.

9. The device as recited in claim 1, wherein the energy management module determines a vehicle driving strategy to minimize a fuel quantity consumption or electrical energy consumption by the vehicle.

10. The method as recited in 4, wherein the energy management module determines a vehicle driving strategy to minimize a fuel quantity consumption or electrical energy consumption by the vehicle.

11. The system as recited in claim 7, wherein the energy management module determines a vehicle driving strategy to minimize a fuel quantity consumption or electrical energy consumption by the vehicle.

* * * * *